United States Patent [19]

Lang et al.

[11] 4,333,347

[45] Jun. 8, 1982

[54] STIMULATING ELECTRO-ACOUSTICAL TRANSDUCERS

[75] Inventors: Raimund Lang, Wasserlos; Jörg Quittkat, Neuberg; Gert Fischer, Mülheim; Dieter Lather, Rheurdt, all of Fed. Rep. of Germany

[73] Assignees: Mannesmann Aktiengesellschaft, Düsseldorf; Nukem GmbH, Hanau, both of Fed. Rep. of Germany

[21] Appl. No.: 46,541

[22] Filed: Jun. 7, 1979

Related U.S. Application Data

[63] Continuation-in-part of Ser. No. 927,047, Jul. 24, 1978, abandoned.

[51] Int. Cl.[3] .......... G01N 29/04

[52] U.S. Cl. .......... 73/642; 73/632

[58] Field of Search .......... 73/642, 632, 609

[56] References Cited

U.S. PATENT DOCUMENTS 3,546,927 12/1970 Dickinson .......... 73/642

OTHER PUBLICATIONS

Krautkramer et al., *Ultrasonic Testing of Materials,* pp. 133–142, Section 7.3, (1977).

*Primary Examiner*—Anthony V. Ciarlante
*Attorney, Agent, or Firm*—Smyth, Pavitt, Siegemund & Martella

[57] ABSTRACT

A transducer for launching ultrasonic test signals is stimulated by an electrical signal which is of trapezoidal contour. Particularly the trailing edge of the signal is to decline at a rate similar at least as to order of magnitude to the rise time, and occurring in synchronism with a natural zero crossing of the vibration of the transducer to fully develop at least one full ultrasonic oscillation.

3 Claims, 3 Drawing Figures

STIMULATING ELECTRO-ACOUSTICAL TRANSDUCERS

BACKGROUND OF THE INVENTION

This application is a continuation-in-part of application Ser. No. 927,047 filed July 24, 1978 now abandoned.

The present invention relates to a method of operating electro-acoustic transducers such as ultrasonic test heads.

Ultrasonic test equipment includes ultrasonic transmitter-transducers which produce mechanical oscillators upon being triggered or stimulated by a high voltage pulse. These pulses are characterized by steep rise times and high amplitudes such as 100 to 1000 volts. Such a stimulating pulse usually peaks and decays thereafter exponentially.

The test heads for ultrasonic testing usually are comprised of a vibrating element such as a piezo-electric device or the like which is suitably suspended or mounted. Electrodes are physically connected to the vibrating device and the electrodes in turn are connected to the electric circuitry which produces the electrical pulse. This circuitry may additionally include matching impedances and signal lines or cable. In some instances transformers are included in the electrical circuit connection. Moreover, in many instances one operates these transducers in two different modes; the transmitter mode for launching ultrasonic signals in response to the electrical stimulation as described, and the receiver mode in which the transducer listens to acoustic return signals (echos) and converts them into electrical signals across the electrodes. Additional circuitry is required here to separate electrically transmission from receiving.

It can readily be seen that the ultrasonic signal proper that is being produced by such a transmitter in the transmit mode, is dependent upon a fairly large plurality of parameters. Of course, the transmitter circuit "sees" the transducer as an impedance, primarily a capacitor, for the unidirectional pulse as applied. Conversely, the vibrating and transducing element itself "sees" all the input circuitry as an impedance, and various components (coils, capacitors) can be used to obtain a particular effective impedance at the transducer, for the transmitter, but the characteristic of the transducer itself is subject to some tolerance and variations in resonance frequency and band width etc.

The transducer is, so to speak, hit hard by a single pulse left to decay after pearking. The stimulation is usually not carried out by an electrical AC signal in synchronism with resonance oscillations of the transducer, but by a unidirectional pulse. Moreover, the transducer once stimulated vibrates at its resonance frequency and functions, in fact, as an active impedance which produces its own EMF. The energizing circuit for the transducer is "seen" by the transducer as non-resonating impedance so that the overall result is an effective, rather slowly decaying voltage envelope across the transducer electrodes, and the transducer issues a train of ultrasonic vibrations of decaying amplitude. Consequently, one does not employ the transducer at optimum capability. Most importantly, the ultrasonic pulses, particularly the initial pulse as produced, is smaller than it should be. Moreover, the decaying transmitter signal and the correspondingly decaying train of acoustic signals being launched produce a reduced resolution as far as analysis of any return signals is concerned.

DESCRIPTION OF THE INVENTION

It is an object of the present invention to provide a new method of energizing electro-acoustic transducers.

It is a specific object of the present invention to provide a new method of operating ultrasonic test transducers upon employment thereof for non-destructive testing of structural materials by means of ultrasonics.

In accordance with the preferred embodiment of the invention, it is suggested to apply an electrical pulse to such an ultrasonic transducer having a short rise time at a steep leading edge; to hold the peak value for a particular period of time, so that the total pulse period is at least approximately equal to one, or an odd multiple of, half of the resonance period of the transducer; and to run the stimulating signal down again, along a steep trailing edge and in synchronism with the or a natural return of the vibrating transducer. The signal level should be held thereafter to that level to extinguish all possible transients as between the energizing circuit and the transducer proper. The signal drop off or fall time should be at least of the same order of magnitude of the rise time. Actually, these two periods should be approximately similar, corresponding to the rise time of an oscillation at the resonance frequency of the transducer.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows a transmitter pulse 1 as it is conventionally applied to and effective on an ultrasonic test transducer. The pulse has a very sharp rise time in the order of 101 n-sec. towards a maximum amplitude as determined by the effective impedance in the transmitter circuit as well as in the yet unstimulated transducer. The pulse delays exponentially, branch 3, as a result of signal decay inherent in the electronics and as a result of the effective impedance of the transducer when in fact vibrating.

Figure 1:
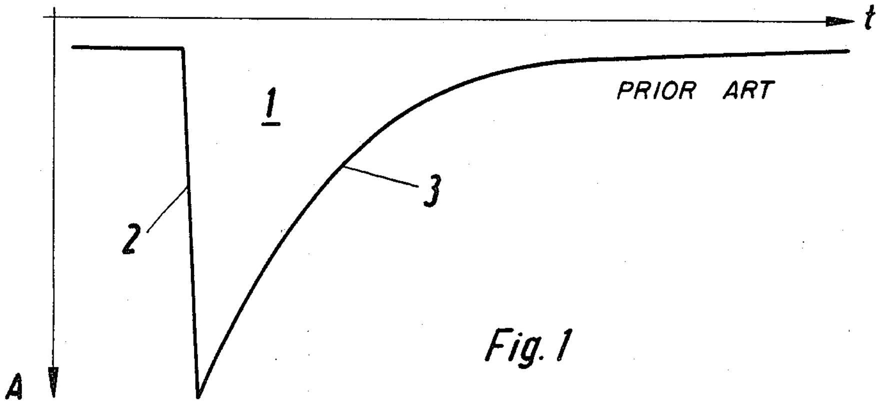
FIG. 1 is a diagram depicting a pulse as it is conventionally used as transducer stimulating signal.

The energization of the ultrasonic transducer and wave generation results primarily from the leading edge 2 of the signal. However, the transducer responds at its resonance frequency, or at least by one of its modes, either being more or less unrelated to the rise time of signal edge 2. The resonance frequency is primarily determined by the material and the geometry of the transducing, e.g. a piezo-electric element, but the mechanical suspension of that element, the coupling to the medium to which the ultrasonic signals are launched and the electric circuit connected to the transducer electrodes have additional influence on that frequency. The envelope of the train of acoustic vibrations and the contour of the signal, particularly the trailing portion 3 thereof are intimately related. Thus, the envelope of the acoustic signals is primarily determined by the transient onset of the vibrations following the initial stimulation, by the attenuation which the transducer experiences, and by the voltage as applied, particularly after the initial peak. The latter signal contour is usually just the result of electrical energization delay whereby the voltage as actually applied by the transmitter circuit is the result of transient behavior in the circuit following a controlled power off or the like. That transient behavior is, of course, influenced by the effective impedance (capacitance) of the transducer, furthermore, which upon vibrating becomes an electrically active element. The curve 3 is the composite effect of all these parameters. The interaction between the transmitter circuit and the transducing element, furthermore, amounts to a mutual interference in the operation of each of them, electrical signal generation and vibrations respectively, so that the overall result is a combination of transient and decay effects resulting in a corresponding fairly uncontrolled sequence of ultrasonic vibrations along an envelope that decays even slower than the one shown by branch 3 in FIG. 1. Typically, the rise time of such a pulse is about 10–20 nanoseconds, while the signal level has dropped to about 1/e from its peak level in about 50–500 n-sec.

Figure 2:
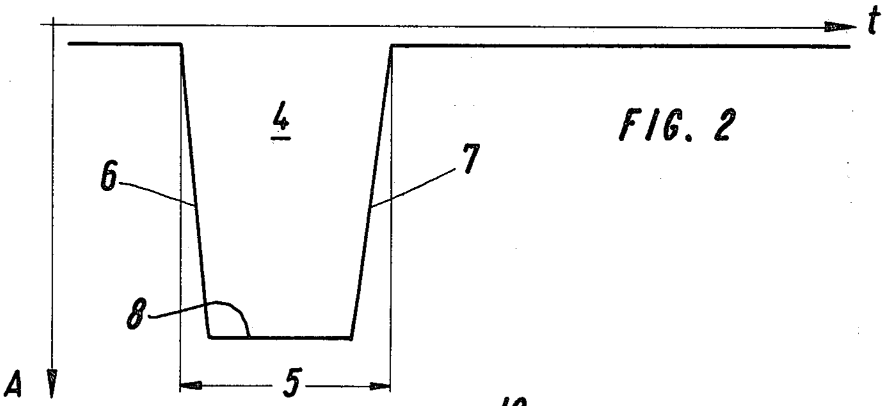
FIG. 2 is a diagram of the pulse to be used in accordance with the present invention.
Figure 3:
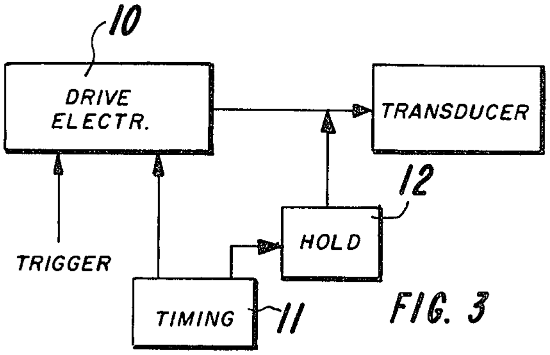
FIG. 3 is a block diagram for illustrating how the inventive method can be practiced.

In accordance with the invention, a trapezoidal signal is produced as depicted in FIG. 2. The signal is characterized by a particular rise time (leading edge 6) up to a peak value. The transducer will undergo a physical displacement in a particular direction which is the onset of a vibration. The signal amplitude is to remain constant for a particular period of time, followed by a definite steep signal drop along the edge 7, back to a zero level or its equivalent. The total signal period 5 is also to be well defined, from onset of the leading edge to a definite return to zero along steep edge 7. That steep edge follows synchronically the return displacement of the transducer itself and in the direction opposite the above-mentioned particular initial displacement. For example, the trailing edge of the signal is produced as the transducer swings back after about half an oscillating period or an odd multiple thereof. The dashed superimposed curve in FIG. 2 illustrates vibratory displacement of the transducer.

For carrying out the invention, the steep signal production is carried as usual, but following the completion of onset, the voltage as applied by a drive electronic 10 to the transducer is held and may be clamped to a particular peak level 8 to be maintained fo a definite period of time so that the pulse in toto covers preferably just one, possibly several, but not many odd numbered multiples of half the oscillating periods of the vibrating element to which the signal is applied. It is not desirable to select this pulse duration period 5 too long as in that case two separate pulse sequences would be launched, one on the leading edge and one on the trailing edge.

Subsequently, the signal level is actively returned to the zero level (timer 11). Specifically, and for example, the signal flank 7 is not the result of a voltage decay on account of a voltage turn off; it is not the result of transient effects. Rather, the voltage as applied and effective is controlled to follow that particular characteristic 7, commensurate with a synchronous phase of the transducer vibration as its active vibrating portion undergoes a return from a deflection corresponding to the initial deflection resulting from the pulse as applied. If the resulting trapezoidal pulse has a duration of a half wave, one can expect one full vibratory oscillation to be developed and launched by the transducer, followed by a natural decay of that oscillation in several oscillation periods.

If the electrical potential as applied to the transducer is left floating after completion of the edge 7, the decay will follow a particular rate, without further influence by the transducer electronics except the effective electrical impedance across the transducer electrodes as "seen" by the transducer. Preferred, however, is to hold the respective two electrodes of the transducer, for example, to a particular potential by actively clamping them to ground potential, through very low impedance circuitry 12, inhibiting the development of a voltage across the electrodes from any source and for any reason. Thus, the signal voltage generation is in effect accompanied by active attenuation of the voltage as applied by the transmitter circuit *and* as effective across the transducer which includes particularly running the charge down which unidirectional stimulating pulse establishes on the capacitively reacting transducer. In fact, nodes are established on the electrodes, e.g. through operational amplifiers to prevent any voltage rise on either electrode. Consequently, the production of ultrasonic vibrations cease very shortly at that end of flank 7.

The actively maintaining of the signal contour 8-7 as well as the active termination of the effective signal level results in the production of, relatively speaking, large useful acoustic signal amplitudes and a definite termination of the effective launch. Consequently, the overall signal to noise relationships is readily improved. Particularly electrical as well as acoustic noise is more readily recognizable so that the certainty of the test results is definitely improved.

By way of example, a transducer launching ultrasonic vibrations as its resonance frequency should be stimulated by a pulse whose rise time corresponds in steepness the zero crossing steepness of an oscillation having that frequency. A typical pulse duration (width 5) will preferably be a little less than half an oscillating period, and the fall-time of signal edge 7 corresponds to the rise time, resulting in a trapezoidal signal. Moreover, the signal portion 7 in particular can be produced by way of capacity charge or discharge (including the discharge of the transducer capacitors) through a constant current source, running the potential of the electrodes (or one of them) to ground followed by clamping the two electrodes to ground irrespective of any current that may still flow off the transducer.

Since all these signal portions are actively generated, either of them can be adjusted through appropriate impedance adjustment in the transmitter circuit. The pulse duration may be determined by a monostable device whose stable period can be made adjustable.

The invention is not limited to the embodiments described above but all changes and modifications thereof not constituting departures from the spirit and scope of the invention are intended to be included.

We claim:

1. Method of stimulating and energizing an electroacoustic transducer comprising the steps of producing an electrical signal with a definite rise time and as applied to the transducer;

holding the energizing level to a particular amplitude for a period so that the total pulse period is at least approximately equal to one or an odd multiple of half an oscillating period at a resonance frequency of the transducer; and running the signal level back to a zero or reference level to be actively maintained thereafter for positively inhibiting the production of ultrasonic signals by the transducer following the steep traversing edge.

2. Method as in claim 1 and including the step of controlling the signal drop off or fall time to be of similar order of magnitude as the rise time.

3. Method of stimulating and energizing an electro-acoustic transducer, comprising:

the steps of producing an energizing voltage that rises at a rapid rate and is applied to the transducer and subsequently causing the voltage as applied to the transducer to drop to and to be maintained at a lower level at a time coinciding at least approximately with a zero crossing of the vibrating transducer, thereby inhibiting and overcoming the tendency of the voltage across the transducer to drop off at an exponential rate determined by capacitive discharge of the transducer after having been stimulated.

* * * * *